US009524134B2

(12) United States Patent
Shintani

(10) Patent No.: US 9,524,134 B2
(45) Date of Patent: Dec. 20, 2016

(54) DEVICE, SYSTEM AND RECORDING MEDIUM FOR SHARING PRINT-JOB PROCESSING BURDEN BETWEEN PORTABLE TERMINAL AND POWER-SAVE-MODE-ENABLED IMAGING APPARATUS

(71) Applicant: Kyocera Document Solutions Inc., Osaka (JP)

(72) Inventor: Yoshihisa Shintani, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 14/871,994

(22) Filed: Sep. 30, 2015

(65) Prior Publication Data

US 2016/0092148 A1    Mar. 31, 2016

(30) Foreign Application Priority Data

Sep. 30, 2014  (JP) ................. 2014-200162

(51) Int. Cl.

| G06F 15/00 | (2006.01) |
|---|---|
| G06F 3/12 | (2006.01) |
| G06K 1/00 | (2006.01) |
| H04N 1/00 | (2006.01) |

(52) U.S. Cl.
CPC .......... *G06F 3/1292* (2013.01); *G06F 3/1212* (2013.01); *G06F 3/1247* (2013.01); *G06F 3/1267* (2013.01); *G06F 3/1276* (2013.01); *G06F 3/1286* (2013.01); *G06F 3/1288* (2013.01); *H04N 1/00204* (2013.01); *H04N 1/00307* (2013.01); *H04N 2201/0094* (2013.01)

(58) Field of Classification Search
CPC .... G06F 3/1296; G06F 3/1297; G06F 3/1293; G06F 3/1292; G06F 3/1288; G06F 3/1267; G06F 3/1276; G06F 3/1286; G06F 3/1212; G06F 3/1247; G06K 15/00; H04N 1/00204; H04N 1/00307; H04N 2201/0094
USPC ............................. 358/1.1, 1.15, 1.13, 1.14
See application file for complete search history.

(56) References Cited

U.S. PATENT DOCUMENTS

| 8,213,026 B2* | 7/2012 | Sugiyama ......... H04N 1/00885 358/1.1 |
| 2008/0231899 A1* | 9/2008 | Morimoto ............. G06F 3/1204 358/1.15 |

FOREIGN PATENT DOCUMENTS

JP         2005-078461 A         3/2005

* cited by examiner

*Primary Examiner* — Douglas Tran
(74) *Attorney, Agent, or Firm* — James Judge

(57) ABSTRACT

A portable communication terminal causes an image forming apparatus to print. The portable communication terminal includes a terminal storage unit, an operation unit, a processing unit, and a terminal communication. The processing unit calculates a first required time and a second required time. The first required time is a time spent when the image forming apparatus performs a predetermined image processing on the generated print job data. The second required time is a time spent when the portable communication terminal performs the predetermined image processing on the generated print job data. When the first required time is equal to or less than the second required time, the processing unit causes the image forming apparatus to perform the predetermined image processing. When the first required time is longer than the second required time, the processing unit (Continued)

performs the predetermined image processing on the print job data.

7 Claims, 5 Drawing Sheets

DEVICE, SYSTEM AND RECORDING MEDIUM FOR SHARING PRINT-JOB PROCESSING BURDEN BETWEEN PORTABLE TERMINAL AND POWER-SAVE-MODE-ENABLED IMAGING APPARATUS

INCORPORATION BY REFERENCE

This application is based upon, and claims the benefit of priority from, corresponding Japanese Patent Application No. 2014-200162 filed in the Japan Patent Office on Sep. 30, 2014, the entire contents of which are incorporated herein by reference.

BACKGROUND

Unless otherwise indicated herein, the description in this section is not prior art to the claims in this application and is not admitted to be prior art by inclusion in this section.

At the time of printing, usually, image processing is performed on image data. Usually, a plurality of kinds of image processing is performed on image data. The image processing includes processing having a large calculation amount and processing performing complicated calculation. An image forming apparatus or an information processing device having a low processing capacity might take a long time to complete the image processing. Therefore, data processing related to printing is sometimes executed by an information processing device (such as a server) having a high processing capacity.

There is proposed one example of a technique that causes this information processing device having a high processing capacity to alternatively execute data processing. Specifically, one technique is a network system including a client, who requests data processing, and one or more servers, which performs the data processing requested from the client. This network system is configured as a distributed-image-processing network system where: the client acquires processing capacity information for the respective servers, acquires state information for the respective servers, determines the server to be requested to perform the data processing based on the processing capacity information and the state information, notifies one or a plurality of determined servers about the request of the data processing, and receives the data processed by the server; and the server processes the data corresponding to the notification from the client and transmits the processed data to the client. This configuration attempts to automatically determine an appropriate server to perform image processing related to printing.

SUMMARY

A portable communication terminal according to one aspect of the disclosure causes an image forming apparatus to print. The portable communication terminal includes a terminal storage unit, an operation unit, a processing unit, and a terminal communication. The terminal storage unit stores data for a target of a print job. The operation unit accepts an execution instruction of the print job based on the data stored in the terminal storage unit. The processing unit generates print job data to execute the print job based on the data stored in the terminal storage unit when the execution is instructed, so as to perform image processing on the print job data. The terminal communication unit transmits the print job data to the image forming apparatus and communicates with the image forming apparatus. The terminal storage unit stores: a device-side throughput as a data amount processable by image processing per unit time in the image forming apparatus; a terminal-side throughput as a data amount processable by image processing per unit time in the portable communication terminal; and a return time since the image forming apparatus returns from a power-saving mode until the image forming apparatus becomes a state that enables starting image processing. The power-saving mode stops power supply to a portion that performs the image processing in the image forming apparatus. The processing unit: recognizes a size of the generated print job data; causes the terminal communication unit to check whether the image forming apparatus to which the print job data is transmitted is in the power-saving mode or not; calculates a first required time and a second required time. The first required time is a time spent when the image forming apparatus performs a predetermined image processing on the generated print job data. The second required time is a time spent when the portable communication terminal performs the predetermined image processing on the generated print job data. The first required time is calculated based on a time obtained by adding the return time to a value obtained by dividing a data size of the print job data by the device-side throughput when the image forming apparatus is in the power-saving mode and calculated based on a value obtained by dividing the data size of the print job data by the device-side throughput when the image forming apparatus is not in the power-saving mode. The second required time is calculated based on a value obtained by dividing the data size of the print job data by the terminal-side throughput. When the first required time is equal to or less than the second required time, the processing unit causes the terminal communication unit to transmit the print job data before the predetermined image processing to the image forming apparatus and causes the image forming apparatus to perform the predetermined image processing. When the first required time is longer than the second required time, the processing unit performs the predetermined image processing on the print job data and causes the terminal communication unit to transmit the print job data after the predetermined image processing to the image forming apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
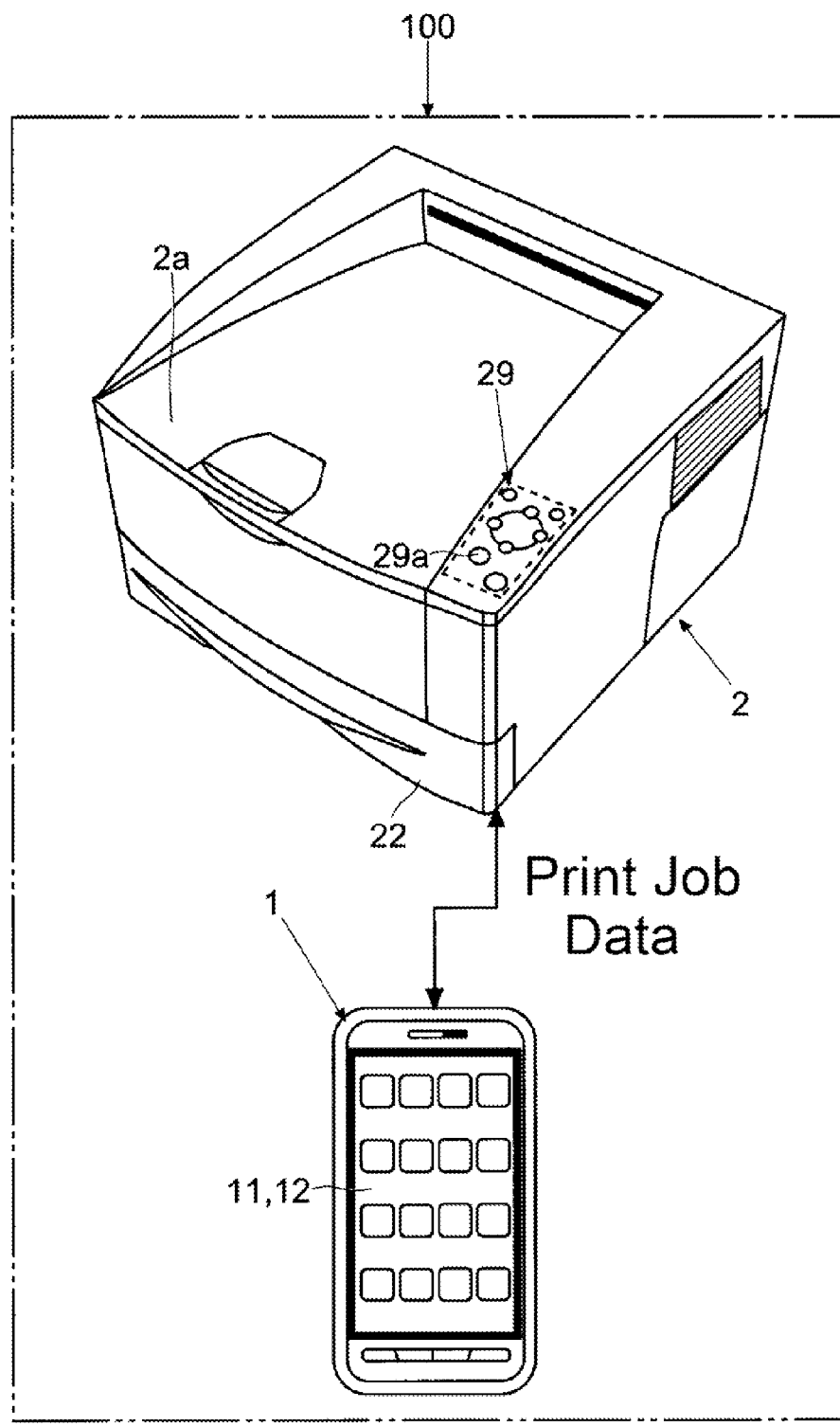
FIG. 1 illustrates an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure using FIGS. 1 to 5. Here, a description will be given of an image forming system 100 including a portable communication terminal 1 and a printer 2 (corresponding to an image forming apparatus) as an example. However, the respective elements such as the configuration and the arrangement described in this embodiment do not limit the scope of the disclosure and are only simple description examples.

Schematic Configuration of Image Forming System 100

Firstly, based on FIG. 1, a description will be given of the outline of the image forming system 100 according to the embodiment. FIG. 1 illustrates one example of the image forming system 100.

Firstly, a printer 2 will be described. The printer 2 receives print job data from the portable communication terminal 1 or similar member. Then, the printer 2 performs printing based on the print job data. The print job data is information (for example, information where a document created by the portable communication terminal 1 or a web page browsed by the portable communication terminal 1 is described as a structure) where the content to be printed is described in a data description language or a data structure. The print job data transmitted from the portable communication terminal 1 to the printer 2 might include image data itself (the content to be printed, for example, the photograph taken by the portable communication terminal 1). The print job data also includes information related to setting of printing.

The following describes the portable communication terminal 1. As illustrated in FIG. 1, the portable communication terminal 1 according to this embodiment is configured as a smart phone or tablet computer. On the portable communication terminal 1, a print application A1 (print driver) is installed. The print application A1 achieves a function that generates the print job data of a specified target (data), transmits the print job data to the printer 2, and causes the printer 2 to perform printing. Accordingly, the image forming system 100 transmits the print job data from the portable communication terminal 1 to the printer 2 so as to cause the printer 2 to perform a print job based on the print job data.

Here, the portable communication terminal 1 that is customized and on which a dedicated application is installed to be in close cooperation with the printer 2 may be sold together with an image forming apparatus.

The portable communication terminal 1 includes a display unit 11. The display unit 11 is, for example, a liquid crystal panel. On an idle screen in the display unit 11, an icon of the application used when the portable communication terminal 1 is used is displayed.

The portable communication terminal 1 includes a touch panel unit 12 (corresponding to an operation unit). The user can touch the display unit 11 of the portable communication terminal 1 to perform various operations. For example, an operation by touching the touch panel unit 12 causes specifying the data to be printed and instructing execution of a print job. Although not shown in FIG. 1, on the back side of the portable communication terminal 1, an imaging unit 15 (camera) is disposed. The portable communication terminal 1 enables a phone call using a mobile phone network and data communication based on a data communication network provided by a communications company.

Configuration of Image Forming Apparatus

Figure 2:
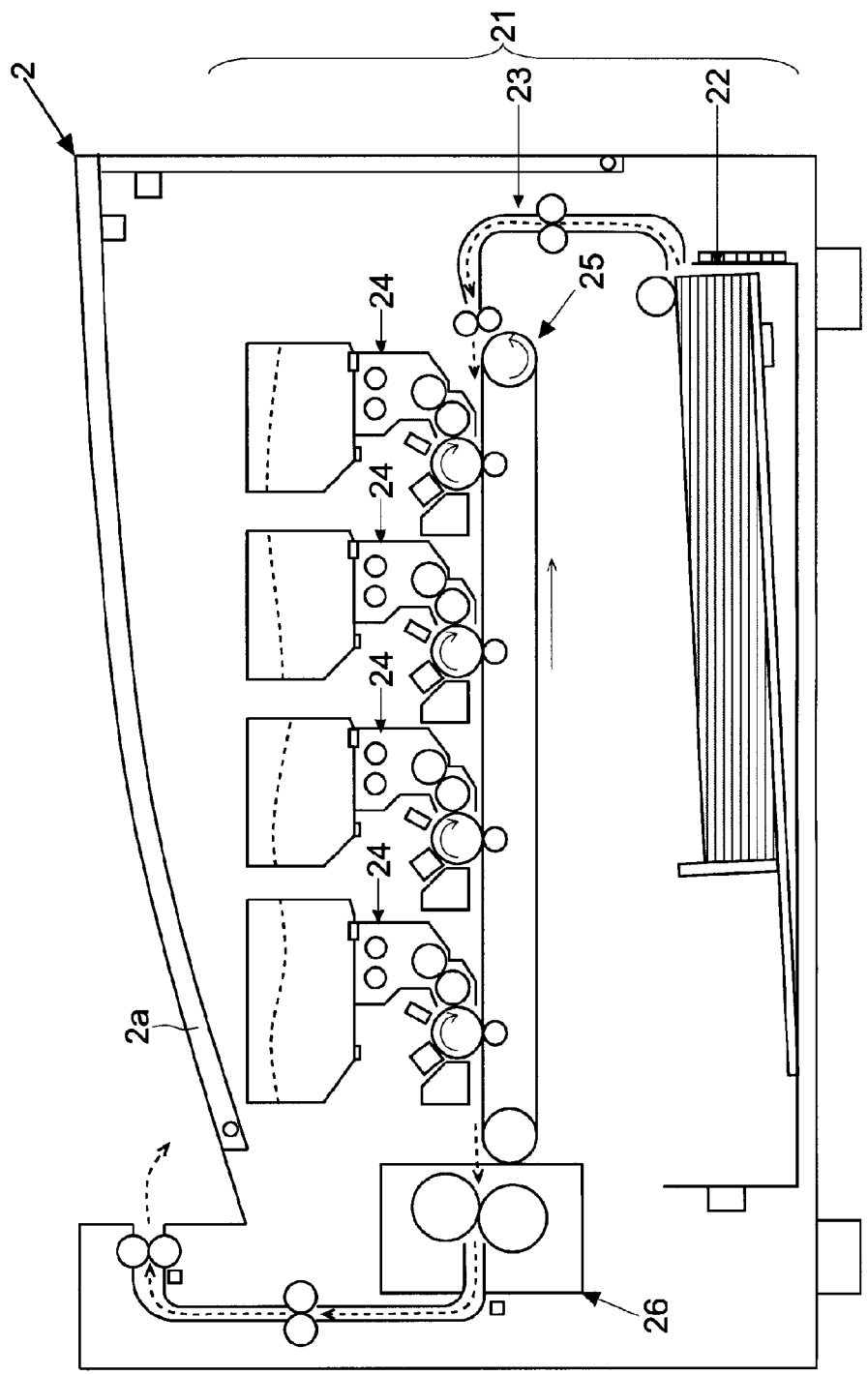
FIG. 2 illustrates an image forming apparatus according to the one embodiment.

The following describes a schematic configuration of the printer 2 according to one embodiment based on FIG. 2. FIG. 2 illustrates one example of the printer 2.

As illustrated in FIG. 2, the printer 2 internally includes a printing unit 21 (see FIG. 4), which performs printing. The printing unit 21 includes a paper sheet feeder 22, a conveying unit 23, an image forming unit 24, a conveyance belt unit 25, and a fixing unit 26. The paper sheet feeder 22 feeds paper sheets one by one to the conveying unit 23. The conveying unit 23 conveys the paper sheets to the image forming unit 24. The image forming unit 24 generates a toner image corresponding to image data based on the print job data. The conveyance belt unit 25 conveys paper sheets, transfers the toner image formed by the image forming unit 24 to a paper sheet, and feeds the paper sheet on which the toner image is transferred into the fixing unit 26. During the passage through the fixing unit 26, the paper sheet is heated and pressurized. Accordingly, the toner image is fixed to the paper sheet. Then, the paper sheet is discharged to a discharge tray 2a (the top cover). Accordingly, the image formation is completed.

Hardware Configuration of Image Forming System 100

Figure 3:
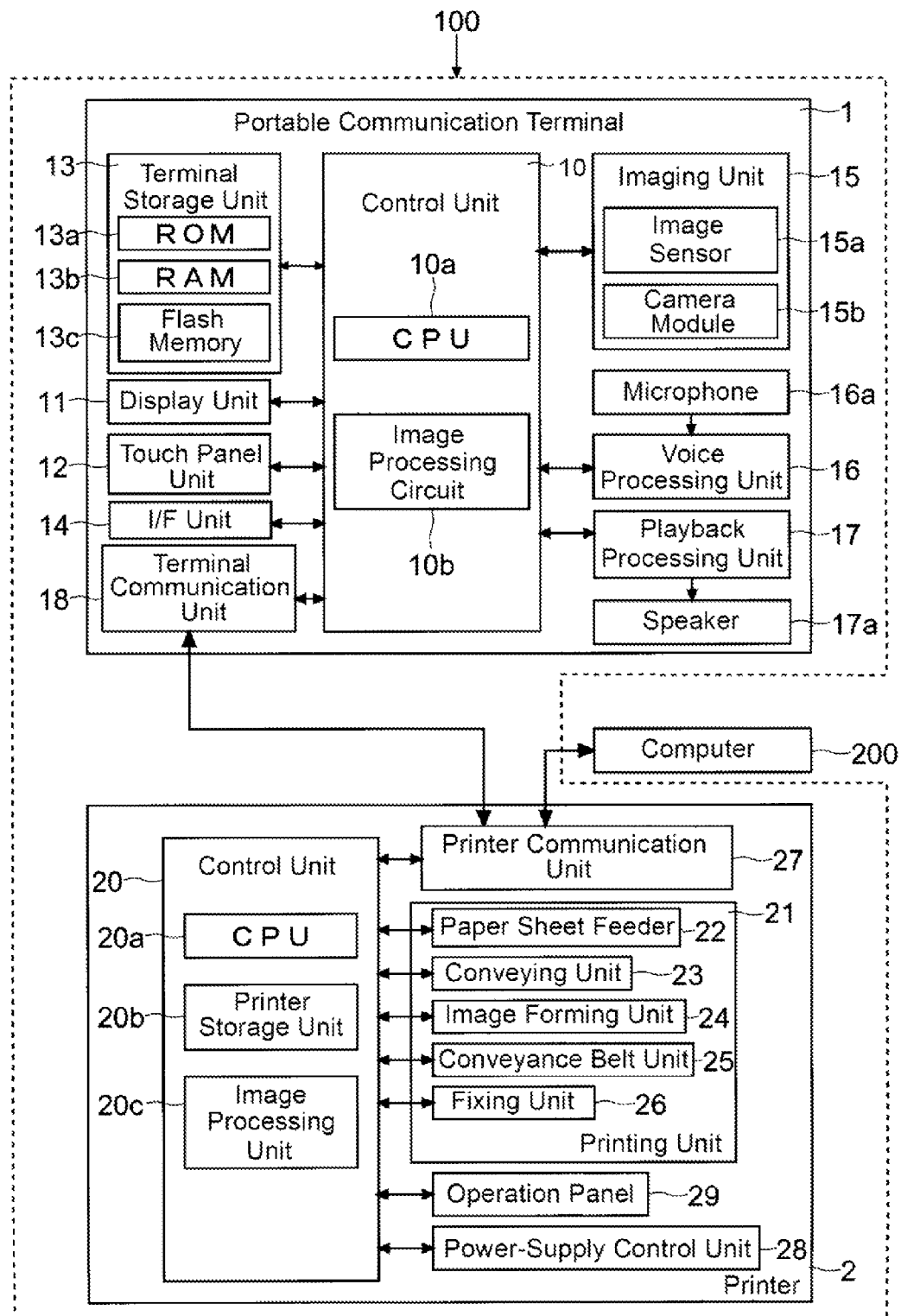
FIG. 3 illustrates a hardware configuration of the image forming system according to the one embodiment.

The following describes one example of the hardware configuration of the image forming system 100 according to the one embodiment using FIG. 3. FIG. 3 illustrates one example of the hardware configuration of the image forming system 100.

Firstly, the printer 2 will be described. The printer 2 internally includes a control unit 20. The control unit 20 manages the operation control of the printer 2. The control unit 20 includes, for example, a CPU 20a, a printer storage unit 20b, and an image processing unit 20c. The CPU 20a is a central processing unit. The CPU 20a controls the respective portions of the printer 2 based on the control program and the control data stored in the printer storage unit 20b.

The printer storage unit 20b is constituted by combination of non-volatile and volatile storage devices such as a ROM and a RAM. This printer storage unit 20b can store various data such as the control program, the control data, the setting data, the image processing program, and the image data for the printer 2. The control unit 20 connects to the respective portions such as the printing unit 21 (the paper sheet feeder 22, the conveying unit 23, the image forming unit 24, the conveyance belt unit 25, and the fixing unit 26) and an operation panel 29 (see FIG. 1) using signal lines and a bus, so as to control the operations.

The control unit 20 includes the image processing unit 20c, which performs image processing on the received print job data (including the image data generated based on the print job data). The control unit 20 communicatively connects to a printer communication unit 27, which includes various connectors, sockets, and similar member. The printer communication unit 27 is an interface to communicate with a computer 200 (such as a personal computer and a server, only one of which is illustrated in FIG. 3 for convenience) and the portable communication terminal 1. The printer communication unit 27 receives the print job data from the computer 200 and the portable communication terminal 1. The image processing unit 20c performs image processing on the print job data received by the printer communication unit 27. The image processing unit 20c performs image processing while reflecting the user's print setting set by the portable communication terminal 1. The image processing unit 20c finally generates output image data used for forming a toner image by the image forming unit 24 (laser exposure apparatus). The control unit 20 causes the printing unit 21 to perform printing based on the print job data (the generated output image data) processed by the image processing unit 20c.

The following describes the portable communication terminal 1. The portable communication terminal 1 includes a processing unit 10, the display unit 11, the touch panel unit 12, a terminal storage unit 13 (a ROM 13a, a RAM 13b, and a flash memory 13c), an I/F unit 14, the imaging unit 15, a voice processing unit 16, a microphone 16a, a playback processing unit 17, a speaker 17a, and a terminal communication unit 18.

The processing unit 10 is a unit that controls the operation of the portable communication terminal 1. For example, the processing unit 10 is an SoC, and includes a CPU 10a and an image processing circuit 10b. The CPU 10a controls the operation of the portable communication terminal 1 based on the OS and the application in the portable communication terminal 1. The image processing circuit 10b can perform image processing on various data.

The terminal storage unit 13 stores the control program and the control data for the portable communication terminal 1. The processing unit 10 controls the respective portions of the portable communication terminal 1 in accordance with the control program, the control data, and the application stored in the terminal storage unit 13 that is a non-transitory computer-readable recording medium. The terminal storage unit 13 can store a downloaded application.

The display unit 11 displays various information in accordance with the instruction of the processing unit 10. The touch panel unit 12 connects to the processing unit 10. The processing unit 10 recognizes a touched position based on the output of the touch panel unit 12. The processing unit 10 recognizes a touched target among icons, buttons, keys, and similar element displayed on the display unit 11. For example, the application can be started or a phone call can be made by pressing icons, buttons, keys, and similar element.

On the I/F unit 14, connectors, sockets, communication chips based on various standards are mounted. The I/F unit 14 reads the data and the program stored in the recording medium (such as a memory card) inserted into the I/F unit 14 and writes the data to the recording medium. The imaging unit 15 is a camera disposed in the portable communication terminal 1. The imaging unit 15 includes an image sensor 15a and a camera module 15b in addition to a lens. The camera module 15b includes a digital signal processor that processes the analog signal output from the image sensor 15a, generates digital image data, and processes the generated digital image data (signal). The image data obtained by imaging in the imaging unit 15 is stored in the terminal storage unit 13.

The terminal communication unit 18 includes an antenna and a communication circuit. The terminal communication unit 18 can access a mobile phone network. The terminal communication unit 18 transmits and receives voice data. Accordingly, it is possible to make a phone call to a destination phone. The terminal communication unit 18 can also access a data communication network provided by a telecommunication carrier. The terminal communication unit 18 can perform data communication with the printer 2 (the printer communication unit 27) via the data communication network. For example, the communication between the portable communication terminal 1 (the terminal communication unit 18) and the printer 2 (the printer communication unit 27) is performed via an IP network. Here, the communication between the terminal communication unit 18 and the printer communication unit 27 may be performed by another method such as a wireless LAN.

The voice processing unit 16 performs signal processing on a voice input from the microphone 16a into the form transmittable from the terminal communication unit 18. The playback processing unit 17 plays back a destination voice data received by the terminal communication unit 18 to cause the speaker 17a to play back the voice data.

Power-Saving Mode of Printer 2

The following describes a power-saving mode of the printer 2 using FIGS. 2 and 3. The printer 2 has a normal mode (ready mode) and the power-saving mode. The normal mode is a mode that keeps the printer 2 in a printable state. The normal mode performs a process that heats the fixing unit 26 (energize the heater of the fixing unit 26 to maintain the temperature) and continues energizing the printing unit 21. Electric power is supplied to all the portions of the control unit 20. Accordingly, a certain amount of electric power is consumed also in a standby state without printing.

Therefore, to reduce the electric power consumed by the printer 2 in the standby state, the printer 2 according to this embodiment has the power-saving mode. When a predetermined transition condition is satisfied, the control unit 20 sets the printer 2 to the power-saving mode. The transition condition is determined as necessary. For example, the transition condition is that a power saving key 29a disposed in the operation panel 29 is operated (see FIG. 1). The transition condition is that a predetermined power-saving-mode transition time (for example, several ten seconds to several minutes) has passed without reception of the print job data since the completion of the start of the printer 2 or since the completion of the last printing. The control unit 20 may determine that the transition condition is satisfied when a power-saving-mode transition instruction is received from the portable communication terminal 1.

When a transition to the power-saving mode is made, the power supply to the portion without receiving a supply of electric power in the power-saving mode (to a predetermined supply stop portion) in the printer 2 is stopped. The supply stop portion is set to, for example, a part of the printing unit 21, the image processing unit 20c, and the CPU 20a. The supply stop portion may be set to the entire control unit 20. Here, the power supply to the printer communication unit 27 is continued to receive the print job data also in the power-saving mode. To control the supply and the stop of the electric power to the supply stop portion, a power-supply control unit 28 is disposed. When a transition to the power-saving mode is made, the power-supply control unit 28 stops the power supply to the supply stop portion.

The printer 2 internally includes a power supply unit (not illustrated) that, for example, performs rectification and steps down a voltage for a commercial power supply. The supply stop portion connects to a power-supply-portion device using a power supply line. The power-supply control unit 28 turns ON/OFF the circuit (such as a switch and a DC-DC converter) disposed in the power supply line to the supply stop portion, so as to control supply and stop of power to the supply stop portion.

When a returning condition to the normal mode is satisfied in the power-saving mode, the printer 2 becomes the normal mode. The returning condition is determined as necessary. For example, the returning condition is that the printer communication unit 27 receives the print job data, to return to the printable state. The returning condition may be set by operating the operation panel 29 and taking in and out the cassette of the paper sheet feeder 22.

When the returning condition is satisfied, the mode of the printer 2 becomes the normal mode. In association with the return to the normal mode, the power-supply control unit 28 restarts the power supply to the supply stop portion. Accordingly, power supply to, for example, a part of the printing unit 21, the image processing unit 20c, and the CPU 20a is started. Then, a starting process of the control unit 20, the image processing unit 20c, and the CPU 20a is performed. In the image forming unit 24, a heating process that heats the fixing unit 26 to a temperature appropriate for printing is started. When the starting process of the image processing unit 20c and the CPU 20a is completed and the fixing unit 26 is warmed sufficiently, the printer 2 becomes the printable state.

Print Job Execution Using Portable Communication Terminal 1

The following describes the execution of a print job using a portable communication terminal with reference to FIG. 2.

In the image forming system 100 according to this embodiment, the portable communication terminal 1 can specify the content (data) to be the target of a print job, perform setting related to the print job, instruct the execution of the print job, transmit the print job data to the printer 2, and cause the printer 2 to perform a print job based on the print job data. The print application A1 (see FIG. 5) stored in the terminal storage unit 13 realizes these functions of the portable communication terminal 1 using, for example, the processing unit 10, the display unit 11, the touch panel unit 12, the terminal storage unit 13, and the terminal communication unit 18.

The terminal storage unit 13 stores the data to be the target of a print job. Then, the portable communication terminal 1 can specify the data to be the target of the print job in the data stored in the terminal storage unit 13 by operation on the touch panel unit 12 (see FIGS. 1 and 2). The data to be the target of the print job includes text data (a file), a document file, image data of a photograph obtained by imaging by the imaging unit 15, the downloaded image data, the display content (such as one home page) of the display unit 11, an e-mail, and similar data.

The portable communication terminal 1 can perform setting related to a print job (printing) by operation on the touch panel unit 12. The portable communication terminal 1 can perform setting of the print-related functions provided with the printer 2, for example, the size of the paper sheet used for printing, the magnification in printing, whether or not to perform an aggregate print, and the image quality of the printed matter.

The portable communication terminal 1 can instruct execution of a print job based on the setting related to printing and the data to be the target of the print job by operation on the touch panel unit 12.

When the touch panel unit 12 accepts the execution instruction of the print job, the processing unit 10 generates the print job data based on the setting related to the printing and the data to be the target of the print job. The processing unit 10 generates the print job data using a print-job-data generating program included in the print application A1 stored in the terminal storage unit 13.

The print job data includes the data indicative of the content of the print setting set by the portable communication terminal 1. The print job data includes the data where the printing content is described in a data description language. Specifically, the processing unit 10 generates data where the contents (output image) of a printed matter, for example, printing positions of characters, a character type, a character size, and the position, the size, and the color of an image (such as a photograph) or a figure are described and where the printing content performed by the printer 2 is described in a language, and includes the generated data in the print job data.

The processing unit 10 of the portable communication terminal 1 and the control unit 20 (the image processing unit 20c) of the printer 2 can both perform image processing (predetermined image processing) for rendering the data described in the data description language. The rendering process in this description includes a process that analyzes the data described in the data description language, a process (a rasterizing process) that generates image data (such as a bitmap image) from the data described in the data description language, and a screening process such as a halftone dot process.

Then, the terminal communication unit 18 transmits print job data processed by the predetermined image processing or print job data unprocessed by the predetermined image processing to the printer communication unit 27. When the predetermined image processing is performed on the print job data, the control unit 20 (the image processing unit 20c) performs another image processing after the predetermined image processing on the print job data (the image data generated by the predetermined image processing) so as to generate the output image data. When the predetermined image processing is not performed on the print job data, the predetermined image processing is performed on the print job data and the control unit 20 (the image processing unit 20c) performs another image processing after the predetermined image processing on the print job data (the image data generated by the predetermined image processing) so as to generate the output image data. Thus, in the description of this embodiment, the print job data might include the image data generated by the rendering process and the image processing on the print job data might include image processing on the image data generated by the rendering process.

Determination of which Part Executes Predetermined Image Processing

Figure 4:
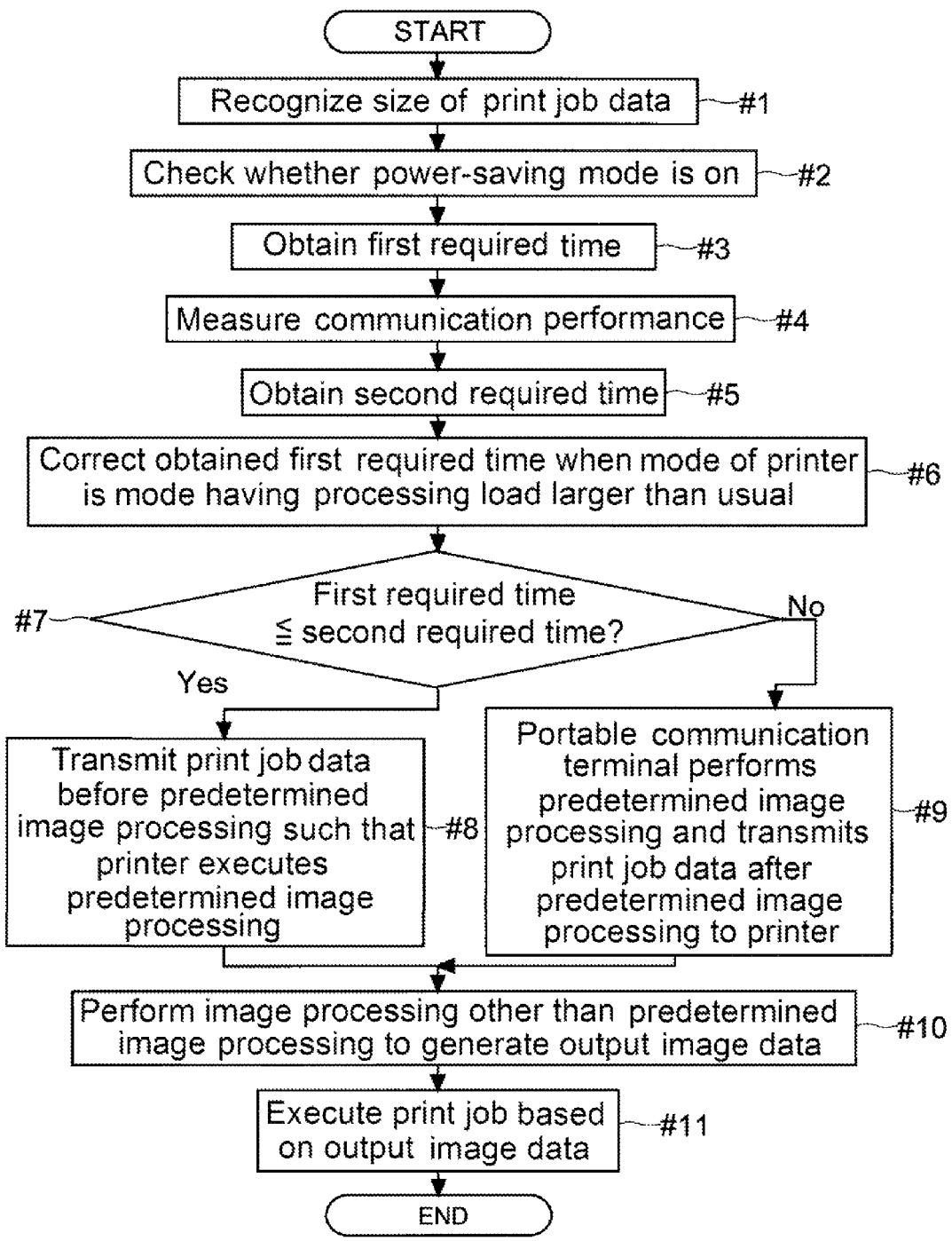
FIG. 4 illustrates one example of a determination process for determining which part of the image forming system according to the one embodiment executes predetermined image processing.
Figure 5:
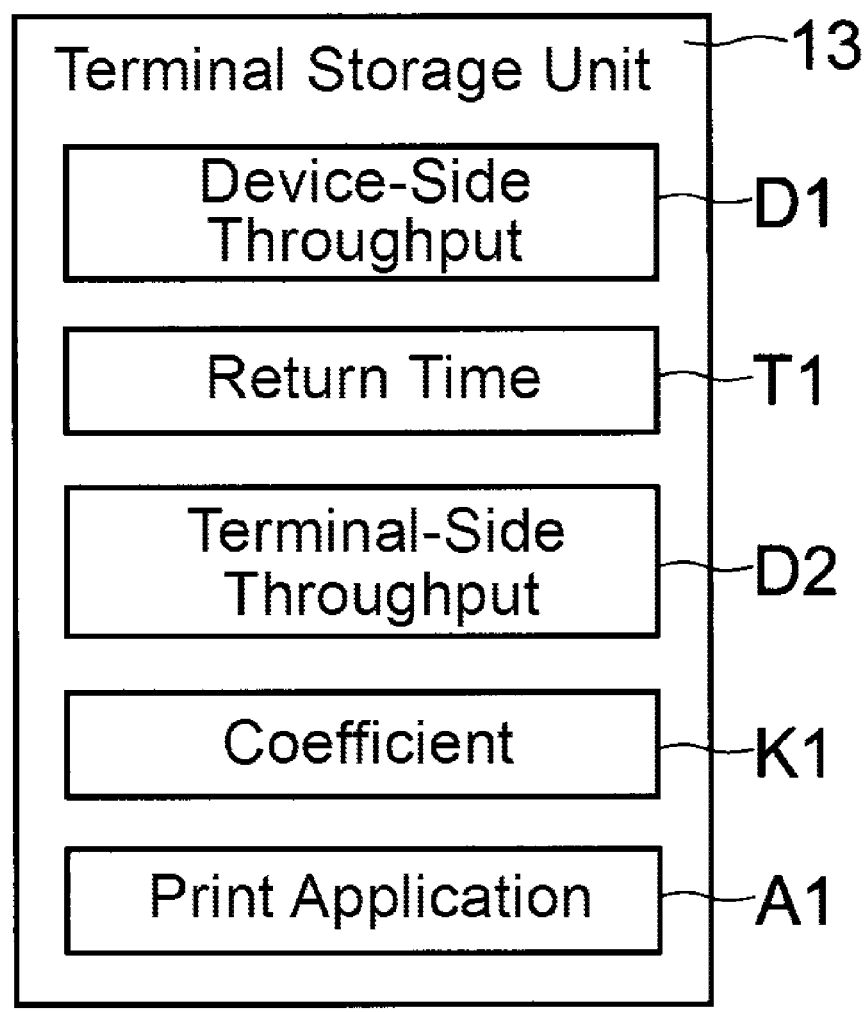
FIG. 5 illustrates one example of memory content in a terminal storage unit of a portable communication terminal according to the one embodiment.

The following describes one example of the procedure of a determination process for determining which of the printer 2 and the portable communication terminal 1 executes the predetermined image processing using FIGS. 4 and 5. FIG. 4 illustrates one example of the procedure of the determination process for determining which part executes the predetermined image processing. FIG. 5 illustrates one example of the memory content of the terminal storage unit 13.

The start in FIG. 4 is the time point when the instruction to execute printing in the printer 2 based on the data stored in the terminal storage unit 13 is issued to the portable communication terminal 1 (the touch panel unit 12) and the processing unit 10 generates the print job data. Firstly, the processing unit 10 of the portable communication terminal 1 recognizes the size of the generated print job data (at Step #1).

Here, the time point when the printer 2 can start the predetermined image processing differs depending on whether the printer 2 is in the power-saving mode or not. Therefore, the processing unit 10 checks whether the printer 2 to perform printing from now based on the print job data is in the power-saving mode or not (at Step #2). Specifically, the processing unit 10 causes the terminal communication unit 18 to transmit a mode notification request to the printer communication unit 27. The mode notification request is a notification for requesting to notify the state where the printer 2 is in the power-saving mode or the normal mode. Thus, the processing unit 10 causes the terminal communication unit 18 to check whether the image forming apparatus (the printer 2) to which the print job data is to be transmitted is in the power-saving mode or not.

On the other hand, the printer communication unit 27 recognizes whether the printer 2 is in the power-saving mode or not. The printer communication unit 27 receives power supply regardless of whether the printer 2 is in the power-saving mode or not. When receiving the mode notification request, the printer communication unit 27 performs a response process. Specifically, the printer communication unit 27 returns the information indicative of whether the printer 2 is in the power-saving mode or not to the terminal communication unit 18 that has issued the mode notification request.

Then, the processing unit 10 obtains a first required time (at Step #3). The first required time (a predicted time until the completion of the image processing when the image forming apparatus performs the predetermined image processing) is a time spent when the image forming apparatus (the printer 2) performs the predetermined image processing on the print job data generated by the portable communication terminal 1.

To obtain the first required time, the terminal storage unit 13 stores a "device-side throughput D1" and a "return time T1" (see FIG. 5). The "device-side throughput D1" is a value in the specification. The device-side throughput D1 is the data amount processable by image processing per unit time in the printer 2 (image forming apparatus) that performs printing based on the print job data. In other words, the device-side throughput D1 is an index of the data throughput per second when the printer 2 performs the predetermined image processing. The "return time T1" is a time since the image forming apparatus returns to the normal mode from the power-saving mode, which stops the power supply to the portion that performs image processing and the portion that performs printing, until the image forming apparatus becomes a state that enables starting the image processing.

The device-side throughput D1 can be preliminarily determined for each model of the image forming apparatus (the printer 2 or a multi-functional peripheral). For example, the above-described print application A1 may include a data table that defines the device-side throughput D1 for each model of the image forming apparatus. The printer communication unit 27 may hold data indicative of the device-side throughput D1, and the processing unit 10 may cause the terminal communication unit 18 to acquire the data indicative of the device-side throughput D1 from the printer communication unit 27.

For example, an experiment may be carried out to measure a data amount per unit time when the printer 2 (the image processing unit 20c) performs the predetermined image processing on the print job data so as to determine the device-side throughput D1 based on the experiment result and store the determined device-side throughput D1 in the terminal storage unit 13.

The return time T1 can also be preliminarily determined for each model of the image forming apparatus (the printer 2 or the multi-functional peripheral) based on the time until the image processing unit 20c and the printer storage unit 20b, which stores the data before image processing and after image processing, are started. The print application A1 may include a data table that defines the return time T1 for each model of the image forming apparatus. The printer communication unit 27 may hold data indicative of the return time T1, and the processing unit 10 may cause the terminal communication unit 18 to acquire the data indicative of the return time T1 from the printer communication unit 27.

Specifically, when the printer 2 is in the power-saving mode, the processing unit 10 obtains the first required time based on the time obtained by adding the return time T1 to the value obtained by dividing the data size of the print job data by the device-side throughput D1.

$$\text{First Required Time} = (\text{Data Size of Print Job Data} / \text{Device-Side Throughput } D1) + \text{Return Time } T1 \quad \text{Formula 1}$$

On the other hand, when the printer 2 is not in the power-saving mode, it is not necessary to consider the time required for returning (the start of the image processing unit 20c and the start of the printer storage unit 20b). Therefore, when the printer 2 is not in the power-saving mode, the processing unit 10 obtains the first required time based on the value obtained by dividing the data size of the print job data by the device-side throughput D1.

$$\text{First Required Time} = (\text{Data Size of Print Job Data} / \text{Device-Side Throughput } D1) \quad \text{Formula 2}$$

After obtaining the first required time, the processing unit 10 causes the terminal communication unit 18 to measure the communication performance (at Step #4). That is, the processing unit 10 causes the terminal communication unit 18 to carry out the data transmission test, so as to obtain the data transmission amount (communication speed) per unit time when the print job data is transmitted to the printer 2. Here, the communication performance does not have to be measured.

Specifically, the processing unit 10 measures the communication speed (performance) on a communication path between the portable communication terminal 1 and the printer 2. For example, the processing unit 10 causes the terminal communication unit 18 to issue a ping command. The transmission destination address of the ping command is the printer 2 (the printer communication unit 27). When the ping command is executed, the data communication (the data transmission test) is performed between the terminal communication unit 18 and the printer 2, being divided into several times. The ping command finds out the data transmission size at one time and the average time (the average response time) spent on data transmission. The processing unit 10 divides the data transmission size at one time by the average time so as to obtain the data transmission amount per unit time (one second).

For example, when the average response time is 0.02 ms and the data transmission size at one time is 18 kbytes, the data transmission amount per unit time (one second) is 18÷0.02=900 kbytes/s. Here, the processing unit 10 may use another method to measure the communication speed instead of the ping command.

Subsequently, the processing unit 10 obtains the second required time (at Step #5). The second required time is the time spent when the portable communication terminal 1 performs the predetermined image processing on the print job data generated by the portable communication terminal 1. In other words, the second required time is the predicted time until the portable communication terminal 1 completes the image processing when performing the predetermined image processing.

To obtain the second required time, the terminal storage unit 13 stores terminal-side throughput D2 (see FIG. 5). When performing the predetermined image processing, the terminal-side throughput D2 indicates the data amount processable by image processing per unit time in the portable communication terminal 1. In other words, the terminal-side throughput D2 is an index of the data throughput per second when the portable communication terminal 1 performs the predetermined image processing.

In the image forming system 100 of this embodiment, the terminal-side throughput D2 is determined based on the ratio between the drive frequency of the control unit 20 (the image processing unit 20c) of the printer 2 and the drive frequency of the processing unit 10 (the image processing circuit 10b) of the portable communication terminal 1. Specifically, the terminal-side throughput D2 is set to the value obtained by multiplying the device-side throughput D1 by the frequency ratio, which is obtained by dividing the drive frequency of the processing unit 10 (the image processing circuit 10b) by the drive frequency of the image processing unit 20c (the control unit 20) of the printer 2.

Specifically, the device-side throughput D1 is set to 100 kbytes/s, the drive frequency of the image processing unit 20c (the control unit 20) of the printer 2 is set to 800 Mhz, and the drive frequency of the processing unit 10 (the image processing circuit 10b) of the portable communication terminal 1 is set to 400 Mhz. At this time, the terminal-side throughput D2 is obtained as follows.

Terminal-Side Throughput $D2=(400\text{ M}/800\text{ M})\times 100=50$ kbytes/s

The processing unit 10 recognizes its own drive frequency (the system configuration). On the other hand, the drive frequency of the control unit 20 (the image processing unit 20c) inside the printer 2 is also preliminarily determined. Therefore, the above-described print application A1 may include a data table that defines the drive frequency of the control unit 20 (the image processing unit 20c) for each model of the image forming apparatus. The printer communication unit 27 may hold the data indicative of the drive frequency of the control unit 20 (the image processing unit 20c), and the processing unit 10 may cause the terminal communication unit 18 to acquire the data indicative of the terminal-side throughput D2 from the printer communication unit 27.

For example, an experiment may be carried out to measure a data amount per unit time when the portable communication terminal 1 (the image processing circuit 10b) performs the predetermined image processing on the print job data so as to determine the terminal-side throughput D2 based on the experiment result and store the determined terminal-side throughput D2 in the terminal storage unit 13.

Specifically, the processing unit 10 obtains the second required time based on the value obtained by dividing the data size of the print job data by the terminal-side throughput D2.

Second Required Time=(Data Size of Print Job Data/Terminal-Side Throughput $D2$)      Formula 3

Here, the processing unit 10 may obtain, as the second required time, the value obtained by adding the value obtained by dividing the data size of the print job data by the data transmission amount per unit time to the value obtained by dividing the data size of the print job data by the terminal-side throughput D2. That is, the time required to transmit the print job data from the portable communication terminal 1 to the printer 2 may be added to the second required time. In this case, the formula to obtain the second required time is as follows.

Second Required Time=(Data Size of Print Job Data/Terminal-Side Throughput $D2$)+(Data Size of Print Job Data/Data Transmission Amount per Unit Time)

When the processing unit 10 checks the communication mode with the printer 2 and the communication mode with the printer 2 is a mode having a processing load larger than usual, the processing unit 10 corrects the obtained first required time (at Step #6). Here, when the communication mode with the printer 2 is not a mode having a processing load larger than usual, the processing unit 10 does not correct the first required time obtained with Formula 1 or Formula 2.

Specifically, the processing unit 10 checks whether the communication mode with the printer 2 is an encrypted communication mode or not. The encrypted communication mode is a mode by a communication between the portable communication terminal 1 and the printer 2 using encrypted data. The encryption can prevent information leakage of the print job data. The portable communication terminal 1 (the touch panel unit 12) can configure a communication with the printer 2 in the encrypted communication mode. When the communication in the encrypted communication mode is configured, the processing unit 10 encrypts the print job data and causes the terminal communication unit 18 to transmit the encrypted print job data to the printer communication unit 27. The program and the data for encryption are included in the print application A1.

The encrypted data cannot be used without being decoded. After decoding is completed, the predetermined image processing is started. The decoding might include a complicated calculation. The time from the start to the end of the predetermined image processing by the control unit 20 (the image processing unit 20c) becomes longer due to addition of the decoding process than that when the communication in the encrypted communication mode is not performed.

Therefore, when the communication mode with the printer 2 is a mode having a processing load larger than usual, the processing unit 10 corrects the obtained first required time. Specifically, when the communication mode between the printer 2 and the information processing device is the encrypted communication mode, the processing unit 10 obtains, as the first required time in the communication mode having a processing load larger than usual, a value obtained by multiplying the first required time obtained with Formula 1 or Formula 2 by a coefficient K1 that is larger than 1 and preliminarily determined.

In the image forming system 100 of this embodiment, two processes of the decoding and the predetermined image processing are performed on the print job data and thus the coefficient K1 is simply set to "2." However, the coefficient K1 can be determined as necessary taking into consideration, for example, the circuit configuration and the cryptographic method of the control unit 20 (the image processing unit 20c) of the printer 2. The data indicative of the coefficient K1 is stored in the terminal storage unit 13 (see FIG. 5). The terminal storage unit 13 may store the different coefficients K1 for each model of the image forming apparatus.

The processing unit 10 compares the obtained first required time and second required time to check whether the first required time is equal to or less than the second required time (at Step #7).

When the first required time is equal to or less than the second required time (Yes at Step #7), the time from the start to the end of the predetermined image processing can be determined to be shorter in the printer 2 than in the portable communication terminal 1. Therefore, when the first required time is equal to or less than the second required time (Yes at Step #7), the processing unit 10 causes the terminal communication unit 18 to transmit the print job data before the predetermined image processing to the printer 2 such that the printer 2 executes the predetermined image processing (at Step #8).

On the other hand, when the first required time is longer than the second required time (No at Step #7), the time from the start to the end of the predetermined image processing can be determined to be shorter in the portable communication terminal 1 than in the printer 2. Therefore, when the first required time is longer than the second required time (No at Step #7), the processing unit 10 performs the predetermined image processing on the print job data so as to cause the terminal communication unit 18 to transmit the print job data after the predetermined image processing to the printer 2 (at Step #9).

After step #8 and step #9, the control unit 20 (the image processing unit 20c) performs image processing other than the predetermined image processing on the print job data corresponding to the print setting set by the portable communication terminal 1, so as to generate the output image data used for print output (exposure for toner image formation) in the image forming unit 24 (at Step #10). Then, the control unit 20 causes the printing unit 21 to perform a print job based on the output image data (at Step #11). Then, the procedure terminates (end of the procedure).

Determination Example

The following describes determination examples whether the portable communication terminal 1 performs the predetermined image processing or the printer 2 performs the predetermined image processing.

Firstly, the respective values in the following determination examples are as follows.

Device-Side Throughput D1=50 kbytes/s
Return Time T1=30 s
Terminal-Side Throughput D2=25 kbytes/s
Data Transmission Amount per Unit Time in
Portable Communication Terminal 1=500 kbytes/s
Coefficient K1 when Communication Mode is
Encrypted communication Mode=2

Here, a description will be given of the example where the calculation result of (data size of print job data/data transmission amount per unit time) is added to the second required time. However, the calculation result of (data size of print job data/data transmission amount per unit time) need not be added to the second required time.

Example 1

Condition 1

The printer 2 is in the power-saving mode.

Condition 2

The communication mode is not the encrypted communication mode, but is an ordinary communication mode.

Condition 3

Print Job Data=10000 kbytes (10 Mbytes).
First Required Time (Time Required when Printer 2 Performs Predetermined Image Processing)=Return Time T1+(Data Size of Print Job Data/Device-Side Throughput D1)=30+(10000÷50)=230 s
Second Required Time (Time Required when Portable Communication Terminal 1 Performs Predetermined Image Processing)=(Data Size of Print Job Data/Terminal-Side Throughput D2)+(Data Size of Print Job Data/Data Transmission Amount per Unit Time)= (10000÷25)+(10000÷500)=400+20=420 s Conclusion:

Because the second required time>the first required time, the portable communication terminal 1 does not perform the predetermined image processing while the printer 2 performs.

Example 2

Condition 1

The printer 2 is in the power-saving mode.

Condition 2

The communication mode is not the encrypted communication mode, but is an ordinary communication mode.

Condition 3

Print Job Data=100 kbytes.
First Required Time (Time Required when Printer 2 Performs Predetermined Image Processing)=Return Time T1+(Data Size of Print Job Data/Device-Side Throughput D1)=30+(100÷50)=32 s
Second Required Time (Time Required when Portable Communication Terminal 1 Performs Predetermined Image Processing)=(Data Size of Print Job Data/Terminal-Side Throughput D2)+(Data Size of Print Job Data/Data Transmission Amount per Unit Time)= (100÷25)+(100÷500)=4+0.2=4.2 s Conclusion:

Because the first required time>the second required time, the portable communication terminal 1 performs the predetermined image processing and transmits the print job data after the predetermined image processing to the printer 2.

Example 3

Condition 1

The printer 2 is in the power-saving mode.

Condition 2

The communication mode is in the encrypted communication mode.

Condition 3

Print Job Data=10000 kbytes (10 Mbytes). First Required Time (Time Required when Printer 2 Performs Predetermined Image Processing)=(Return Time T1+(Data Size of Print Job Data/Device-Side Throughput D1))× Coefficient K1=(30+(10000÷50))×2=(30+200)×2=460 s
Second Required Time (Time Required when Portable Communication Terminal 1 Performs Predetermined Image Processing)=(Data Size of Print Job Data/Terminal-Side Throughput D2)+(Data Size of Print Job Data/Data Transmission Amount per Unit Time)= (10000÷25)+(10000÷500)=400+20=420 s Conclusion:

Because the first required time>the second required time, the portable communication terminal 1 performs the predetermined image processing and transmits the print job data after the predetermined image processing to the printer 2.

Example 4

Condition 1

The printer 2 is in the normal mode.

Condition 2

The communication mode is not in the encrypted communication mode, but is in an ordinary communication mode.

Condition 3

Print Job Data=100 kbytes.
First Required Time (Time Required when Printer 2 Performs Predetermined Image Processing)=Return Time T1+(Data Size of Print Job Data/Device-Side Throughput D1)=0+(100÷50)=2 s
Second Required Time (Time Required when Portable Communication Terminal 1 Performs Predetermined Image Processing)=(Data Size of Print Job Data/Terminal-Side Throughput D2)+(Data Size of Print Job Data/Data Transmission Amount per Unit Time)=(100÷25)+(100÷500)=4+0.2=4.2 s Conclusion:

Because the second required time>the first required time, the portable communication terminal 1 does not perform the predetermined image processing while the printer 2 performs.

Thus, the portable communication terminal 1 according to the embodiment includes the terminal storage unit 13, the operation unit (the touch panel unit 12), the processing unit 10, and the terminal communication unit 18. The terminal storage unit 13 stores the data to be the target of a print job. The operation unit (the touch panel unit 12) accepts the execution instruction of the print job based on the data stored in the terminal storage unit 13. The processing unit 10 can generate the print job data to execute the print job based on the data stored in the terminal storage unit 13 when the execution is instructed, so as to perform image processing on the print job data. The terminal communication unit 18 transmits the print job data to the image forming apparatus (the printer 2) that performs printing so as to communicate with the image forming apparatus. The terminal storage unit 13 stores: the device-side throughput D1, which is the data amount processable by image processing per unit time in the image forming apparatus that performs printing based on the print job data; the terminal-side throughput D2, which is the data amount processable by image processing per unit time in the portable communication terminal 1; and the return time T1, which is the time since the image forming apparatus returns from the power-saving mode, which stops the power supply to the portion that performs image processing and printing, until the image forming apparatus becomes a state that enables starting the image processing. The processing unit 10 recognizes the size of the generated print job data, causes the terminal communication unit 18 to check whether the image forming apparatus to which the print job data is transmitted is in the power-saving mode or not, and obtain the first required time, which is the time spent when the predetermined image processing is performed on the print job data generated by the image forming apparatus, and the second required time, which is the time spent when the portable communication terminal 1 performs the predetermined image processing on the generated print job data. The processing unit 10 obtains the first required time based on the time obtained by adding the return time T1 to the value obtained by dividing the data size of the print job data by the device-side throughput D1 when the image forming apparatus is in the power-saving mode. The processing unit 10 obtains the first required time based on the value obtained by dividing the data size of the print job data by the device-side throughput D1 when the image forming apparatus is not in the power-saving mode, and obtains the second required time based on the value obtained by dividing the data size of the print job data by the terminal-side throughput D2. When the first required time is equal to or less than the second required time, the processing unit 10 causes: the terminal communication unit 18 to transmit the print job data before the predetermined image processing to the image forming apparatus; and the image forming apparatus to perform the predetermined image processing. When the first required time is longer than the second required time, the processing unit 10 performs the predetermined image processing on the print job data so as to cause the terminal communication unit 18 to transmit the print job data after the predetermined image processing to the image forming apparatus.

When the print job data is input to the image forming apparatus (the printer 2) in the power-saving mode, the power-saving mode is released. Then, to transition to a printable state (the normal mode), the image forming apparatus starts the starting process. Accordingly, when the print job data is transmitted to the image forming apparatus in the power-saving state, the image forming apparatus cannot start image processing on the received print job data until the starting of the portion related to the image processing is completed. Therefore, taking into consideration whether the image forming apparatus is in the power-saving mode or not, a comparison is performed between: the predicted time (the first required time) from the present to the completion of the predetermined image processing when the image forming apparatus receives the print job data transmitted from the portable communication terminal 1 and performs the predetermined image processing; and the predicted time (the second required time) from the present to the completion of the predetermined image processing when the portable communication terminal 1 performs the predetermined image processing on the print job data. Then, the predetermined image processing is performed by the device needs a shorter time from the present to the end of the image processing. Accordingly, the print job data (image data) processed by the predetermined image processing can be prepared as quickly as possible. Additionally, the processing load can be dispersed to the image forming apparatus and the portable communication terminal 1. This eliminates the need for installing an expensive server having a high processing speed, and can promptly generate image data processed by the predetermined image processing without a server. The efficient image processing on the print job data shortens the time until a print job is started. Accordingly, a print job can efficiently be executed. Here, the predetermined image processing is a part or all of a plurality of kinds of image processing performed on the print job data and the image data generated from the print job data to execute a print job, and the image processing to be the predetermined image processing can be determined as necessary.

The processing unit 10 causes the terminal communication unit 18 to perform the data transmission test so as to: obtain the data transmission amount per unit time when the print job data is transmitted to the image forming apparatus (the printer 2); obtain, as the transmission required time, the value obtained by dividing the data size of the print job data by the terminal-side throughput D2; and obtain, as the second required time, the value obtained by adding the transmission required time to the value obtained by dividing the data size of the print job data by the data transmission amount per unit time.

Accordingly, the second required time can be obtained taking into consideration the time required to transmit the print job data after the predetermined image processing is performed from the portable communication terminal 1 to the image forming apparatus (the printer 2). Accordingly, it is possible to determine which part executes the image processing corresponding to the state of the communication path (such as a network) between the portable communication terminal 1 and the image forming apparatus. Accordingly, the image processing can be efficiently performed on the print job data.

The terminal storage unit 13 stores, as the device-side throughput D1, the data amount in the specification processable by image processing per unit time in the image forming apparatus (the printer 2) and stores, as the terminal-side throughput D2, the value obtained by multiplying the device-side throughput D1 by the value obtained by dividing the drive frequency of the processing unit 10 by the drive frequency of the image processing unit 20c of the image forming apparatus. Accordingly, the terminal-side throughput D2 can be determined based on the drive frequency to be an index of the processing speed. Therefore, the terminal-side throughput D2 can be simply determined.

A cryptographic communication requires processes such as decoding of data and an error check of the decoded data. Accordingly, the data throughput (processing load) of the image forming apparatus (the printer 2) becomes larger when the print job data is transmitted to the image forming apparatus using the cryptographic communication than usual (when the cryptographic communication is not performed). As a result, when the processing load is larger than usual, the required time for the image processing on the print job data can become longer than that in normal operation. Therefore, the processing unit 10 checks whether the communication mode between the portable communication terminal 1 and the image forming apparatus is a mode having a processing load larger than usual or not. When the communication mode has a large processing load than usual, the processing unit 10 obtains, as the first required time in the communication mode having a processing load larger than usual, the value obtained by multiplying the obtained first required time by the coefficient K1, which is preliminarily determined and larger than 1. Accordingly, it is possible to obtain the first required time corresponding to the time delay until the completion of the image processing due to the mode having a larger processing load of the image forming apparatus than usual.

The processing unit 10 performs the rendering process as the predetermined image processing to transmit the print job data after the rendering process to the image forming apparatus (the printer 2) and causes the image forming apparatus to perform image processing other than the predetermined image processing. Accordingly, it is possible to limit the image processing performed by the portable communication terminal 1. Then, the processing load of the portable communication terminal 1 does not become excessively heavy.

The image forming system 100 includes: the above-described portable communication terminal 1; and the image forming apparatus (the printer 2), which communicates with the portable communication terminal 1 and performs printing based on the print job data received from the portable communication terminal 1 before the predetermined image processing or after the predetermined image processing. This provides the effects similar to those in the above-described portable communication terminal 1.

In the above-described embodiment, the example of the smart phone or the tablet computer 200 has been described as the portable communication terminal 1. However, the portable communication terminal 1 only needs to: include at least the terminal communication unit 18 (the communication unit), the processing unit 10, and the terminal storage unit 13 (the flash memory 13c); generate the print job data; and transmit the print job data to the image forming apparatus. The disclosure is also applicable to, for example, a mobile phone, a personal digital assistance (PDA), and a portable game machine.

In the above-described embodiment, the rendering process is exemplified as the predetermined image processing. However, the predetermined image processing may include processes such as zoom processing and image data format conversion other than the rendering process.

In the above-described embodiment, a description has been given of the example where the return time T1 is stored in the terminal storage unit 13 and employs the value determined for each model of the image forming apparatus. However, the return time T1 stored in the terminal storage unit 13 may be updated based on an actually measured time. In this case, at the time of the return from the power-saving mode, the communication unit and the control unit 20 of the image forming apparatus measure the time until the image forming apparatus becomes a state that enables starting the image processing. Then, the processing unit 10 causes the terminal communication unit 18 to communicate with the communication unit of the image forming apparatus and causes the terminal communication unit 18 to acquire the time (the actually measured time) measured by the image forming apparatus. Then, the processing unit 10 rewrites the data indicative of the return time T1 in the terminal storage unit 13 into the acquired actually measured time. Accordingly, the value of the return time T1 can be set to the value to reflect the actual performance of the image forming apparatus.

The image forming apparatus might have a plurality of power-saving modes having different power consumptions. In other words, the image forming apparatus might have a plurality of power-saving modes with different return times T1. For example, as the time while the image forming apparatus is not operated or used becomes long, the image forming apparatus is further transitioned to the power-saving mode with smaller power consumption. As the power-saving mode uses the decreased power consumption, the processing unit 10 reduces the temperature (the amount of electric power supplied to the fixing unit) of the fixing unit and increases a count of portions to which a supply of electric power is stopped.

Thus, when a plurality of kinds of the power-saving mode is provided, the processing unit 10 causes the terminal communication unit 18 to check: whether the image forming apparatus to which the print job data is transmitted is in the power-saving mode or not; and which power-saving mode is used (which level of the power-saving mode is used). The terminal storage unit 13 stores the return time T1 for each kind (level) of the power-saving mode. The processing unit 10 obtains the first required time based on the time obtained by adding the return time T1 corresponding to the kind of the power-saving mode of the image forming apparatus to the value obtained by dividing the data size of the print job data by the device-side throughput D1.

The disclosure is usable for a portable communication terminal that generates print job data and transmits the print job data to an image forming apparatus or for an image forming system including the portable communication terminal and the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable communication terminal for causing an image forming apparatus to print, the portable communication terminal comprising:
    a terminal storage unit that stores data for a target of a print job;
    an operation unit that accepts an execution instruction of the print job based on the data stored in the terminal storage unit;
    a processing unit that generates print job data to execute the print job based on the data stored in the terminal storage unit when the execution is instructed, so as to perform image processing on the print job data; and
    a terminal communication unit that transmits the print job data to the image forming apparatus and communicates with the image forming apparatus; wherein
    the terminal storage unit stores
        a device-side throughput as a data amount processable by image processing per unit time in the image forming apparatus,
        a terminal-side throughput as a data amount processable by image processing per unit time in the portable communication terminal, and
        a return time since the image forming apparatus returns from a power-saving mode until the image forming apparatus becomes a state that enables starting image processing, the power-saving mode stopping power supply to a portion that performs the image processing in the image forming apparatus; and
    the processing unit
        recognizes a size of the generated print job data,
        causes the terminal communication unit to check whether the image forming apparatus to which the print job data is transmitted is in the power-saving mode or not,
        calculates a first required time and a second required time, the first required time being a time spent when the image forming apparatus performs a predetermined image processing on the generated print job data, the second required time being a time spent when the portable communication terminal performs the predetermined image processing on the generated print job data, the first required time being calculated based on a time obtained by adding the return time to a value obtained by dividing a data size of the print job data by the device-side throughput when the image forming apparatus is in the power-saving mode and calculated based on a value obtained by dividing the data size of the print job data by the device-side throughput when the image forming apparatus is not in the power-saving mode, the second required time being calculated based on a value obtained by dividing the data size of the print job data by the terminal-side throughput,
        when the first required time is equal to or less than the second required time, the processing unit causes the terminal communication unit to transmit the print job data before the predetermined image processing to the image forming apparatus and causes the image forming apparatus to perform the predetermined image processing, and
        when the first required time is longer than the second required time, the processing unit performs the predetermined image processing on the print job data and causes the terminal communication unit to transmit the print job data after the predetermined image processing to the image forming apparatus.

2. The portable communication terminal according to claim 1, wherein the processing unit causes the terminal communication unit to carry out a data transmission test so as to:
    obtain a data transmission amount per unit time when transmitting the print job data to the image forming apparatus;
    obtain, as a transmission required time, a value obtained by dividing a data size of the print job data by the terminal-side throughput; and
    obtain, as the second required time, a value obtained by adding the transmission required time to a value obtained by dividing a data size of the print job data by the data transmission amount per unit time.

3. The portable communication terminal according to claim 1, wherein:
    the terminal storage unit stores a data amount in a specification processable by image processing per unit time in the image forming apparatus as the device-side throughput, and stores a value obtained by multiplying a value obtained by dividing a drive frequency of the processing unit by a drive frequency of an image processing unit of the image forming apparatus by the device-side throughput as the terminal-side throughput.

4. The portable communication terminal according to claim 1, wherein:
    the processing unit checks whether a communication mode between the portable communication terminal and the image forming apparatus is a mode having a processing load increased by encryption or not, and obtains, as the first required time in the communication mode having the increased processing load, a value obtained by multiplying the obtained first required time by a coefficient that is preliminarily determined and larger than 1 in the communication mode having the increased processing load.

5. The portable communication terminal according to claim 1, wherein:
    the processing unit performs a rendering process as the predetermined image processing, transmits the print job data after the rendering process to the image forming apparatus, and causes the image forming apparatus to perform image processing other than the predetermined image processing.

6. An image forming system, comprising:
    the portable communication terminal according to claim 1; and an image forming apparatus that communicates with the portable communication terminal to perform printing based on print job data received from the portable communication terminal before predetermined image processing or after the predetermined image processing.

7. A non-transitory computer-readable recording medium storing a control program for controlling a portable communication terminal for causing an image forming apparatus to print, the control program causing a computer to function as:
  a terminal storage unit that stores data for a target of a print job;
  an operation unit that accepts an execution instruction of the print job based on the data stored in the terminal storage unit;
  a processing unit that generates print job data to execute the print job based on the data stored in the terminal storage unit when the execution is instructed, so as to perform image processing on the print job data; and
  a terminal communication unit that transmits the print job data to the image forming apparatus and communicates with the image forming apparatus; wherein
  the terminal storage unit stores
    a device-side throughput as a data amount processable by image processing per unit time in the image forming apparatus,
    a terminal-side throughput as a data amount processable by image processing per unit time in the portable communication terminal, and
    a return time since the image forming apparatus returns from a power-saving mode until the image forming apparatus becomes a state that enables starting image processing, the power-saving mode stopping power supply to a portion that performs the image processing in the image forming apparatus; and
  the processing unit
    recognizes a size of the generated print job data, causes the terminal communication unit to check whether the image forming apparatus to which the print job data is transmitted is in the power-saving mode or not,
    calculates a first required time and a second required time, the first required time being a time spent when the image forming apparatus performs a predetermined image processing on the generated print job data, the second required time being a time spent when the portable communication terminal performs the predetermined image processing on the generated print job data, the first required time being calculated based on a time obtained by adding the return time to a value obtained by dividing a data size of the print job data by the device-side throughput when the image forming apparatus is in the power-saving mode and calculated based on a value obtained by dividing the data size of the print job data by the device-side throughput when the image forming apparatus is not in the power-saving mode, the second required time being calculated based on a value obtained by dividing the data size of the print job data by the terminal-side throughput,
    when the first required time is equal to or less than the second required time, the processing unit causes the terminal communication unit to transmit the print job data before the predetermined image processing to the image forming apparatus and causes the image forming apparatus to perform the predetermined image processing, and
    when the first required time is longer than the second required time, the processing unit performs the predetermined image processing on the print job data and causes the terminal communication unit to transmit the print job data after the predetermined image processing to the image forming apparatus.

* * * * *